(12) United States Patent
Muninder

(10) Patent No.: US 9,202,288 B2
(45) Date of Patent: Dec. 1, 2015

(54) METHOD, APPARATUS AND COMPUTER PROGRAM PRODUCT FOR PROCESSING OF IMAGE FRAMES

(71) Applicant: Nokia Technologies Oy, Espoo (FI)

(72) Inventor: Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 77 days.

(21) Appl. No.: 14/078,767

(22) Filed: Nov. 13, 2013

(65) Prior Publication Data

US 2014/0147043 A1    May 29, 2014

(30) Foreign Application Priority Data

Nov. 26, 2012 (IN) .......................... 4918/CHE/2012

(51) Int. Cl.
*G06K 9/00* (2006.01)
*G06T 7/40* (2006.01)
*G06T 7/00* (2006.01)

(52) U.S. Cl.
CPC ............... *G06T 7/408* (2013.01); *G06T 7/0028* (2013.01); *G06T 2207/10024* (2013.01)

(58) Field of Classification Search
CPC . H04N 5/2253; H04N 5/232; H04N 5/23267; H04N 5/235; H04N 5/2351; H04N 5/2353; H04N 5/2355; H04N 5/2625; H04N 9/045; H04N 9/09; H04N 9/097; G06T 5/009; G06T 5/50; G06T 7/0028; G06T 7/408; G06T 11/60; G06T 2207/10016; G06T 2207/10024; G06T 2207/10144; G01C 11/025; H01L 31/02162; G01J 3/2823; G01J 3/36; G01J 3/462; G01J 3/513; G01J 2003/2826

See application file for complete search history.

(56) References Cited

U.S. PATENT DOCUMENTS

| | | | |
|---|---|---|---|
| 8,179,466 | B2 | 5/2012 | Border et al. |
| 8,199,222 | B2 | 6/2012 | Drimbarean et al. |
| 8,487,996 | B2 * | 7/2013 | Mann et al. ................... 348/144 |
| 2010/0201831 | A1 | 8/2010 | Weinstein |
| 2011/0096179 | A1 | 4/2011 | Border et al. |
| 2013/0342567 | A1 | 12/2013 | Muninder et al. |

FOREIGN PATENT DOCUMENTS

WO    WO 2010/145910 A1    12/2010

OTHER PUBLICATIONS

Ben-Ezra et al., "Motion Deblurring Using Hybrid Imaging", Proceedings of the IEEE Computer Society Conference on Computer Vision and Pattern Recognition, vol. 1, Jun. 18-20, 2003, pp. 1-8.

(Continued)

*Primary Examiner* — Jose Couso
(74) *Attorney, Agent, or Firm* — Alston & Bird LLP

(57) ABSTRACT

In accordance with an example embodiment a method, apparatus and computer program product are provided. The method comprises receiving color image frames and panchromatic image frames associated with a scene. The color image frames correspond to the panchromatic image frames. The method further comprises computing registration information based on a panchromatic image frame and one or more panchromatic image frames from among the panchromatic image frames. A color image frame corresponding to the panchromatic image frame is modified based on the registration information.

20 Claims, 8 Drawing Sheets

(56) References Cited

OTHER PUBLICATIONS

Bennett et al., "Video Enhancement Using Per-Pixel Virtual Exposures", ACM Transactions on Graphics, Proceedings of ACM SIGGRAPH, vol. 24, Issue 3, Jul. 2005, 8 pages.

Adams et al., "Viewfinder Alignment", Computer Graphics Forum, Proceedings of the Eurographics, vol. 27, Issue 2, 2008, 10 pages.

"Kodak CCD Image Sensors Increase Light Sensitivity", DC Views, Retrieved on Jun. 25, 2014, Webpage available at : http://www.dcviews.com/press/kodak-ccd.htm.

Wang et al., "High Quality Image Deblurring Panchromatic Pixels", ACM Transaction on Graphics, vol. 31, Issue 5, Aug. 2012, 10 pages.

Office Action for corresponding Chinese Application No. 201310601160.7 dated May 26, 2015.

* cited by examiner

METHOD, APPARATUS AND COMPUTER PROGRAM PRODUCT FOR PROCESSING OF IMAGE FRAMES

TECHNICAL FIELD

Various implementations relate generally to method, apparatus, and computer program product for processing of image frames captured by image sensors.

BACKGROUND

The rapid advancement in technology related to capturing images has resulted in an exponential increase in the creation of image content. Devices like mobile phones and personal digital assistants (PDA) are now being increasingly configured with image capturing tools, such as a camera, thereby facilitating easy capture of the image content. Users may capture images corresponding to scenes in various ambient conditions. A quality of a captured image may be affected based on prevailing ambient conditions. For example, in low light ambient conditions, the image quality may be significantly degraded as the captured images may appear dark and lacking in details corresponding to the scenes.

SUMMARY OF SOME EMBODIMENTS

Various aspects of example embodiments are set out in the claims.

In a first aspect, there is provided a method comprising: receiving colour image frames and panchromatic image frames associated with a scene, wherein the colour image frames correspond to the panchromatic image frames; computing registration information based on a panchromatic image frame and one or more panchromatic image frames from among the panchromatic image frames; and modifying a colour image frame corresponding to the panchromatic image frame based on the registration information.

In a second aspect, there is provided an apparatus comprising at least one processor; and at least one memory comprising computer program code, the at least one memory and the computer program code configured to, with the at least one processor, cause the apparatus to at least perform: receive colour image frames and panchromatic image frames associated with a scene, wherein the colour image frames correspond to the panchromatic image frames; compute registration information based on a panchromatic image frame and one or more panchromatic image frames from among the panchromatic image frames; and modify a colour image frame corresponding to the panchromatic image frame based on the registration information.

In a third aspect, there is provided a computer program product comprising at least one computer-readable storage medium, the computer-readable storage medium comprising a set of instructions, which, when executed by one or more processors, cause an apparatus to at least perform: receive colour image frames and panchromatic image frames associated with a scene, wherein the colour image frames correspond to the panchromatic image frames; compute registration information based on a panchromatic image frame and one or more panchromatic image frames from among the panchromatic image frames; and modify a colour image frame corresponding to the panchromatic image frame based on the registration information.

In a fourth aspect, there is provided an apparatus comprising: means for receiving colour image frames and panchromatic image frames associated with a scene, wherein the colour image frames correspond to the panchromatic image frames; means for computing registration information based on a panchromatic image frame and one or more panchromatic image frames from among the panchromatic image frames; and means for modifying a colour image frame corresponding to the panchromatic image frame based on the registration information.

In a fifth aspect, there is provided a computer program comprising program instructions which when executed by an apparatus, cause the apparatus to: receive colour image frames and panchromatic image frames associated with a scene, wherein the colour image frames correspond to the panchromatic image frames; compute registration information based on a panchromatic image frame and one or more panchromatic image frames from among the panchromatic image frames; and modify a colour image frame corresponding to the panchromatic image frame based on the registration information.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6B of the drawings.

Figure 1:
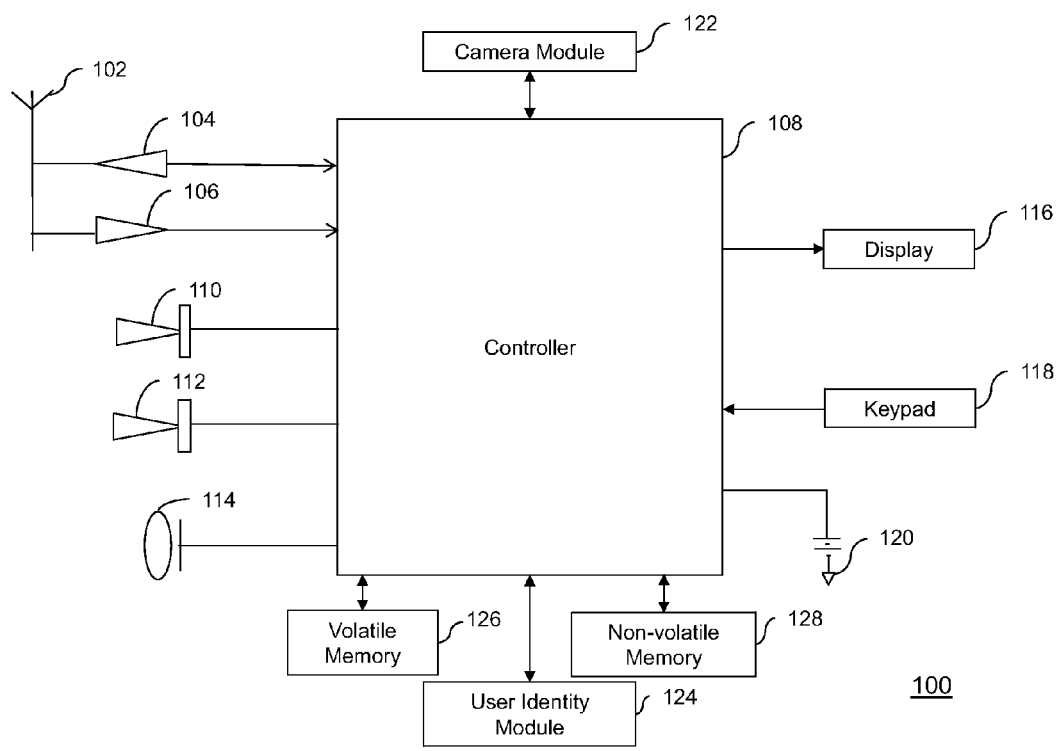
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image frame, video and/or audio for storage, display or transmission. In an example embodiment, the media capturing element is a camera module 122 which may include a digital camera capable of forming a digital image file from a captured image. As such, the camera module 122 includes all hardware, such as a lens or other optical component(s), and software for creating a digital image file from a captured image frame. Alternatively, or additionally, the camera module 122 may include the hardware needed to view an image frame, while a memory device of the device 100 stores instructions for execution by the controller 108 in the form of software to create a digital image file from a captured image frame. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. In an example embodiment, the display 116 may be located on one side of the device 100 and the camera module 122 may include a lens positioned on the opposite side of the device 100 with respect to the display 116 to enable the camera module 122 to capture image frames on one side of the device 100 and present a view of such image frames to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
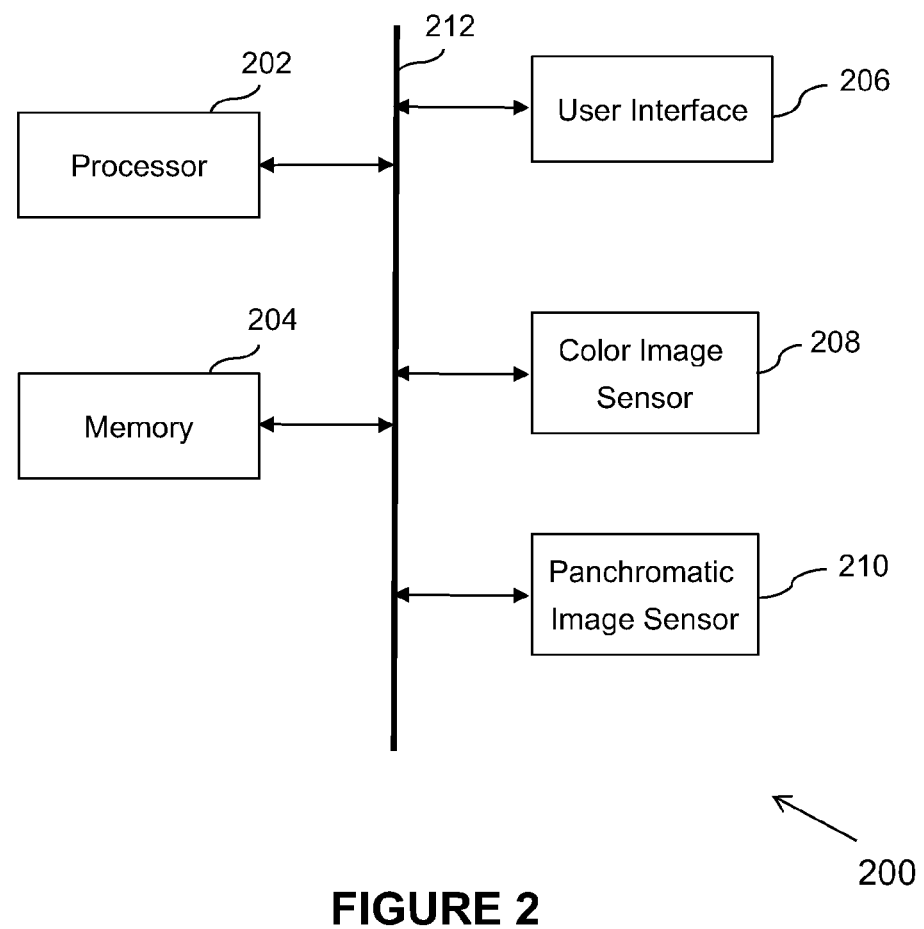
FIG. 2 illustrates an apparatus for processing of image frames in accordance with an example embodiment.

FIG. 2 illustrates an apparatus 200 for processing of image frames in accordance with an example embodiment. The apparatus 200 for processing of image frames may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices). It should also be noted that the devices or elements described below may not be mandatory and thus some may be omitted in certain embodiments.

In an embodiment, the image frames may include colour image frames and panchromatic image frames captured by utilizing the camera module 122 of the device 100, and stored in the memory of the device 100. The image frames may be stored in the internal memory such as hard drive, random access memory (RAM) of the apparatus 200 or in external storage medium such as digital versatile disk, compact disk, flash drive, memory card, or from external storage locations through Internet, Bluetooth®, and the like.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising image frames for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive image frames. In an embodiment, the image frames correspond to a scene.

In an example embodiment, the electronic device may be embodied as to include a colour image sensor, such as a colour image sensor 208, and a panchromatic image sensor, such as a panchromatic image sensor 210. The colour image sensor 208 and the panchromatic image sensor 210 may be in communication with the processor 202 and/or other components of the apparatus 200. The colour image sensor 208 and the panchromatic image sensor 210 may be in communication with other imaging circuitries and/or software, and are configured to capture digital image frames or to make a video or other graphic media files. The colour image sensor 208, the panchromatic image sensor 210 and other circuitries, in combination, may be an example of the camera module 122 of the device 100. In certain example embodiments, colour image sensor 208 and the panchromatic image sensor 210 may be external to the apparatus 200, but accessible and/or controlled by the apparatus 200.

These components (202-210) may communicate with each other via a centralized circuit system 212 for processing of image frames. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the processor 202 is configured to, with the content of the memory 204, and optionally with other components described herein, to cause the apparatus 200 to receive colour image frames and panchromatic image frames associated with a scene. In an embodiment, the colour image frames may be received from the colour image sensor 208, and, the panchromatic image frames may be received from the panchromatic image sensor 210. In an embodiment, the capturing of the colour image frames and the panchromatic image frames corresponding to a scene may be facilitated by a camera module 122 of device 100. The scene may include one or more objects in a surrounding environment of the apparatus 200, for example, a person or a gathering of individuals, birds, books, a playground, natural scenery, such as a mountain, and the like. In an embodiment, the colour image frames and the panchromatic image frames may be received from an internal memory such as hard drive, random access memory (RAM) of the apparatus 200 or from an external storage medium such as digital versatile disk, compact disk, flash drive, memory card, or from external storage locations through Internet, Bluetooth®, and the like. The colour image frames and the panchromatic image frames may also be received from the memory 204. In an embodiment, the colour image frames and the panchromatic image frames may be received via network. Examples of the network may include a wired network, a wireless network and/or a combination thereof. Examples of the wired network include but are not limited to local area network, wide area network, Ethernet and the like. Examples of the wireless network include but are not limited to cellular network, Wi-Fi network, wireless LAN, Zigbee network and the like. An example of combination of the wired network and the wireless network may include but is not limited to the Internet. In an example embodiment, a processing means may be configured to receive the colour image frames and the panchromatic image frames corresponding to the scene. An example of the processing means may include the processor 202, which may be an example of the controller 108.

In an embodiment, the colour image frames correspond to the panchromatic image frames. For example, if the colour image sensor 208 and the panchromatic image sensor 210 capture a scene simultaneously, then the colour image frames and the panchromatic image frames may be related to each other on account of commonality in the scene and the time of capture. In an embodiment, each colour image frame may correspond to a panchromatic image frame. For example, if $C_1, C_2, C_3 \ldots C_N$ and $P_1, P_2, P_3 \ldots P_N$ are the colour image frames and the panchromatic image frames captured by the colour image sensor 208 and the panchromatic image sensor 210, respectively, then the colour image frame $C_1$ may correspond to panchromatic image frame $P_1$, the colour image frame $C_2$ may correspond to panchromatic image frame $P_2$, and so on and so forth.

In an embodiment, a frame rate associated with the capture of the colour image frames may be configured to be equal to the frame rate associated with the capture of the panchromatic image frames. In an embodiment, on account of a sensitivity of the panchromatic image sensor 210 being almost three times a sensitivity of the colour image sensor 208, an auto exposure of the panchromatic image sensor 210 may be configured to be $\frac{1}{3}^{rd}$ of the auto exposure of the colour image sensor 208 for capturing an equivalent number of frames in a given time duration. In an embodiment, an auto exposure for capturing image frames by the colour image sensor 208 may be determined using standard auto-exposure algorithms and the auto-exposure associated with the panchromatic image sensor 210 may be configured to be $\frac{1}{3}^{rd}$ of the auto-exposure determined for the colour image sensor 208.

In an example embodiment, the processor 202 is configured to, with the content of the memory 204, and optionally with other components described herein, to cause the apparatus 200 to compute registration information based on a panchromatic image frame and one or more panchromatic image frames from among the panchromatic image frames. In an embodiment, the one or more panchromatic image frames may precede the panchromatic image frame in the capture order. In some embodiments, the colour image frames and the panchromatic image frames may be captured while an object corresponding to the scene is in motion or an image capture device is not steady while capturing the image frames of the object or both. The motion of the object corresponding to the scene may be referred to as the local motion, and, the motion introduced in the captured image frames due to unsteady image capture device (for example, on account of being handheld) may be referred to as global motion. On account of the global motion and/or the local motion, the captured image frames may include blurring of content, which may produce a distorting effect on the details included in the image frames. Registration may refer to a process of aligning similar content across the captured image frames while taking the global motion and/or the local motion into account. In an embodiment, information associated with the registration process may be referred to as the registration information and may include motion correspondence information, for example motion vector information, capturing the transition between image frames on account of the global motion and the local motion. In an embodiment, computing the registration information may include computing the global registration information (for example, a homography transformation) and the local registration information (for example, local motion vector information).

In an embodiment, the registration information based on a panchromatic image frame and one or more panchromatic image frames is computed. More specifically, global registration information and local registration information between a panchromatic image frame and one or more panchromatic image frames is computed. In an embodiment, computing the global registration information comprises extracting features from the panchromatic image frame and the one or more panchromatic image frames. Examples of the features may include, but are not limited to, corners, edges of an image frame, or other region of interest such as background of the scene. In an example embodiment, the apparatus 200 may be caused to use algorithms such as scale-invariant feature transform (SIFT), Harris corner detector, smallest univalue segment assimilating nucleus (SUSAN) corner detector, features from accelerated segment test (FAST) for extracting features associated with the panchromatic image frame and the one or more panchromatic image frames. Alternatively, extracting the features may be performed by applying one of DCT, DST, KLT transform and a Hadamard transform on macroblocks corresponding to the panchromatic image frame and the one or more panchromatic image frames. In an example embodiment, the DCT is applied on macroblocks corresponding to the panchromatic image frame and the one or more panchromatic image frames and the DC components thus obtained may be treated as features. In an embodiment, the DC components may be obtained by partially decoding the panchromatic image frame and the one or more panchromatic image frames.

In an embodiment, computing the global registration information further comprises matching the features extracted from the panchromatic image frame and the one or more panchromatic image frames. In an embodiment, computing the global registration information further comprises determining the homography transformation between the panchromatic image frame and the one or more panchromatic image frames based on the matching of the extracted features. In an embodiment, algorithms such as random sample consensus (RANSAC) may be used for determining the homography transformation between the panchromatic image frame and the one or more panchromatic image frames. In an embodiment, for image capture instances involving camera panning motion, global registration information may be obtained by estimating the 3-d rotation angles. In an embodiment, the homography transformation between the panchromatic image frame and another panchromatic image frame may be represented in form of registration matrix. For example, features from a panchromatic image frame $P_1$ and a panchromatic image frame $P_2$ may be extracted and matched. A homography transformation may be determined between $P_1$ and $P_2$, and the determined homography transformation may be represented in form a registration matrix $H_{12}$.

In an embodiment, computing the local registration information comprises generating a compensated panchromatic image frame corresponding to at least one panchromatic image frame of the one or more panchromatic image frames based on the homography transformation associated with the at least one panchromatic image frame. For example, if the panchromatic image frame is represented by $P_1$ and the one or more panchromatic image frames are represented by $P_2$, $P_3$ and $P_4$, then for at least one of the panchromatic image frames $P_2$-$P_4$, a compensated panchromatic image frame is generated based on homography transformation associated with panchromatic image frames $P_2$-$P_4$. If the homography transformation for panchromatic image frames $P_2$-$P_4$ are represented by homography transformation matrices $H_{12}$, $H_{13}$ and $H_{14}$, respectively, then the compensated panchromatic image frames corresponding to panchromatic image frames $P_2$-$P_4$ may be obtained as $H_{12}*P_2$, $H_{13}*P_3$ and $H_{14}*P_4$ respectively.

In an embodiment, computing the local registration information further comprises computing a difference image frame based on the compensated panchromatic image frame and the panchromatic image frame. In an embodiment, the difference image frame may be computed by subtracting the compensated panchromatic image frame from the panchromatic image frame. For example, if a compensated panchromatic image frame is generated for panchromatic image frame $P_2$ (computed as $H_{12}*P_2$) then the difference image frame, denoted as $D_{12}$ may be computed as depicted by equation (1) as:

$$D_{12} = P_1 - H_{12}*P_2 \qquad \text{Eq. (1)}$$

In an embodiment, computing the local registration information further comprises comparing a pixel value attribute associated with each block of pixels of a plurality of blocks of pixels configuring the difference image frame with a pre-defined threshold value. In an embodiment, the pixel value attribute is one of an average pixel value, a maximum pixel value, a pixel value sum associated with each block of pixels of the plurality of blocks of pixels configuring the difference image frame. In an embodiment, a pixel value for each pixel in the difference image frame $D_{12}$ is computed by subtracting the pixel values of the panchromatic image frames and the compensated panchromatic image frames. For example, the pixel value of each pixel at co-ordinates (x, y) in the difference image frame $D_{12\,(x,y)}$ may be computed based on equation (1) as depicted in equation (2):

$$D_{12(x,y)} = P_{1(x,y)} - H_{12}*P_{2(x,y)} \qquad \text{Eq. (2)}$$

where, $P_{1(x,y)}$ and $H_{12}*P_{2(x,y)}$ correspond to pixel values of pixels at co-ordinates (x, y) in panchromatic image frame $P_1$ and compensated panchromatic image frame $P_2$, respectively. Based on the pixel values computed as depicted in equation (2), one of an average pixel value, a maximum pixel value, a pixel value sum may be computed for each block of pixels of the plurality of blocks of pixels configuring the difference image frame and may be associated with the corresponding block of pixel as a pixel value attribute.

In an embodiment, a pixel value attribute, such as an average pixel value, associated with each block of pixels (for example, 32×32 non overlapping pixel blocks) of a plurality of blocks of pixels configuring the difference image frame may be computed and compared with a pre-defined threshold value. In an example embodiment, the pre-defined threshold value may be heuristically determined and may correspond to substantially small value approaching zero. In an example embodiment, computing the local registration information further comprises performing motion compensation for one or more blocks of pixels from among the plurality of blocks of pixels configuring the difference image frame, where the pixel value attribute associated with each of the one or more blocks of pixels is determined to exceed the pre-defined threshold value. For example, if average pixel value (denoted by $D_{(x,y)}$) for a block of pixels of the plurality of blocks of pixels is compared with a pre-defined threshold value of 1 and if $D_{(x,y)}$ is greater than 1 as depicted in equation (4), $$D_{(x,y)} > 1 \qquad \text{Eq. (3)}$$

then motion compensation may be performed for the corresponding block of pixels. In an embodiment, performing the motion compensation for each block of pixels may generate local motion vector information. In an embodiment, the computed local registration information may include the local motion vector information corresponding to one or more blocks of the difference image frame. In an example embodiment, a processing means may be configured to compute registration information between a panchromatic image frame and one or more panchromatic image frames from among the panchromatic image frames. An example of the processing means may include the processor 202, which may be an example of the controller 108.

In an example embodiment, the processor 202 is configured to, with the content of the memory 204, and optionally with other components described herein, to cause the apparatus 200 to modify a colour image frame corresponding to the panchromatic image frame based on the registration information. For example, if the registration information is computed for a panchromatic image frame $P_1$ then a colour image frame, for example colour image frame $C_1$, corresponding to the panchromatic image frame $P_1$ from among the colour image frames may be modified based on the computed registration information. In an embodiment, registration information is determined for the colour image frame corresponding to one or more colour image frames. In an embodiment, the one or more colour image frames correspond to the one or more panchromatic image frames based on which the registration information is computed. For example, if the registration information is computed for the panchromatic image frame $P_1$ corresponding to the one or more panchromatic image frames $P_2, P_3 \ldots P_N$, then registration information is determined for a colour image frame $C_1$ corresponding to one or more colour image frames $C_2, C_3 \ldots C_N$, where the colour image frame $C_1$ corresponds to the panchromatic image frame $P_1$ and where the colour image frames $C_2, C_3 \ldots C_N$ correspond to the panchromatic image frames $P_2, P_3 \ldots P_N$. In an embodiment, registration information from the colour image frame and the one or more colour image frames is equivalent to the computed registration information based on the panchromatic image frames. As explained, the colour image frames and the panchromatic image frames may be captured by the colour image sensor 208 and the panchromatic image sensor 210 corresponding to the scene simultaneously at an equal frame rate. As a result, each colour image frame corresponds to a panchromatic image frame from among the panchromatic image frames. On account of the correspondence, the registration information (for example, the global registration information and the local registration information) for the colour image frame and the one or more colour image frames may be equivalent to the computed registration information from the panchromatic image frames. In an embodiment, the colour image sensor 208 and the panchromatic image sensor 210 may be affixed to a rigid body (for example, body of the apparatus 200 or the device 100). Due to rigid body motion, the global-motion of both image sensors and the local motion in the scene between successive frames, produce the same effect in the colour image sensor 208 and the panchromatic image sensor 210. The colour image frame (for example, colour image frame $C_1$) may be modified based on the registration information computed for the panchromatic image frame (for example, panchromatic image frame $P_1$). In an example embodiment, a processing means may be configured to modify a colour image frame corresponding to the panchromatic image frame based on the registration information. An example of the processing means may include the processor 202, which may be an example of the controller 108.

In an example embodiment, the processor 202 is configured to, with the content of the memory 204, and optionally with other components described herein, to cause the apparatus 200 to add pixels values of pixels of the one or more colour image frames to pixel values of corresponding pixels of the colour image frame based on the registration information for modifying the colour image frame. As explained, the registration information computed for the panchromatic image frame may be used as the registration information between the colour image frame and the one or more colour image frames. Based on the registration information, similar pixels across the colour image frame and the one or more colour image frames may be aligned and the pixel values (for example, values corresponding to luminance/chrominance and in effect an intensity of the pixels) in the one or more colour image frames may be added to the pixel values of the corresponding pixels in the colour image frame for increasing an intensity associated with the colour image frame. For example, based on the determined registration information between the colour image frame $C_1$ and the one or more colour image frames $C_2, C_3 \ldots C_N$, pixel values associated with pixels in the one or more colour image frames $C_2, C_3 \ldots C_N$ may be added to pixel values of corresponding pixels of the colour image frame $C_1$ thereby modifying the colour image frame $C_1$. An intensity of the modified colour image frame is greater than intensity associated with the unmodified colour image frame $C_1$ on account of addition of the pixel values to the pixels corresponding to the colour image frame. One or more colour image frames may similarly be modified thereby increasing a brightness of colour image frames captured in low light conditions. In an example embodiment, a processing means may be configured to add pixel values of pixels of the one or more colour image frames to pixel values of corresponding pixels of the colour image frame based on the registration information for modifying the colour image frame. An example of the processing means may include the processor 202, which may be an example of the controller 108.

In an example embodiment, the processor 202 is configured to, with the content of the memory 204, and optionally with other components described herein, to cause the apparatus 200 to update pixel values of pixels of the colour image frame with average pixel values obtained from averaging of pixel values of pixels in the one or more colour image frames and the pixel values of the corresponding pixels of the colour image frame based on the registration information for modifying the colour image frame. For example, based on the determined registration information between the colour image frame $C_1$ and the one or more colour image frames $C_2, C_3 \ldots C_N$, average pixel values may be obtained by averaging pixel values associated with pixels in the one or more colour image frames $C_2, C_3 \ldots C_N$ and the pixel values of corresponding pixels of the colour image frame $C_1$. The pixel values of the pixels associated with the colour image frame $C_1$ may be updated with the average pixel values, thereby modifying the colour image frame $C_1$. An intensity of the modified colour image frame is greater than intensity associated with the unmodified colour image frame $C_1$ on account of averaging of the pixel values of the pixels. In an embodiment, the pixel values of the one or more colour image frames may be added and sum value may be averaged with the pixel values of the colour image frame. The pixel values of the colour image frame may be updated with the average pixel values for modifying the colour image frame. One or more colour image frames may be similarly be modified thereby increasing a brightness of the colour image frames captured in low light conditions. In an example embodiment, a processing means may be configured to update pixel values of pixels of the colour image frame with average pixel values obtained from averaging of pixel values of pixels in the one or more colour image frames and the pixel values of the corresponding pixels of the colour image frame based on the registration information for modifying the colour image frame. An example of the processing means may include the processor 202, which may be an example of the controller 108.

In an example embodiment, the processor 202 is configured to, with the content of the memory 204, and optionally with other components described herein, to cause the apparatus 200 to determine a number of colour image frames in the one or more colour image frames for modifying the colour image frame. In an embodiment, the number of colour image frames in the one or more colour image frames for modifying the colour image frame is determined based on tone mapping. For example, based on tone mapping, it may be determined that a desired light intensity in the colour image frame may require addition and/or averaging of pixel values from 'X' number of colour image frames from among the one or more colour image frames. Accordingly, based on the global and local registration information, pixel values from only those 'X' number of colour image frames may be utilized for modifying the colour image frame. In an embodiment, for every location in the colour image frame being modified, a number of pixels chosen from neighbouring colour image frames may be varied and may not include all the colour image frames $C_2$, $C_3 \ldots C_N$. In an embodiment, the number of pixels to be added/averaged may be determined by comparing a light intensity associated with the colour image frame being modified to a light intensity of a target colour image frame $C_1'$ in an ongoing manner. In an embodiment, the colour image frame $C_1$ may be subjected to tone-mapping, (e.g., a gamma curve with a gamma value of 2.2) to generate the target colour image frame $C_1'$. The number of pixels to be added and/or averaged, for example K pixels, where K<=N, may be computed by checking a cumulative sum/average value of the pixels at a pixel location in colour image frame being modified, such that the pixel value is same or closer to the value of the pixel at the corresponding pixel location in target colour image frame $C_1'$. For example, if at a pixel location $(x_1, y_1)$, upon adding and/or averaging the pixel values from colour image frames $C_2$, $C_3$ and $C_4$ if the pixel value matches the pixel value of the target colour image frame $C_1'$ at location $(x_1, y_1)$, then the colour image frame at location $(x_1, y_1)$ may be modified by just adding pixel values from $C_2$, $C_3$ and $C_4$ only. In an example embodiment, a processing means may be configured to determine a number of colour image frames in the one or more colour image frames for modifying the colour image frame. An example of the processing means may include the processor 202, which may be an example of the controller 108. A schematic illustrating an overview for processing of the image frames, such as the colour image frames, is explained with reference to FIG. 3.

Figure 3:
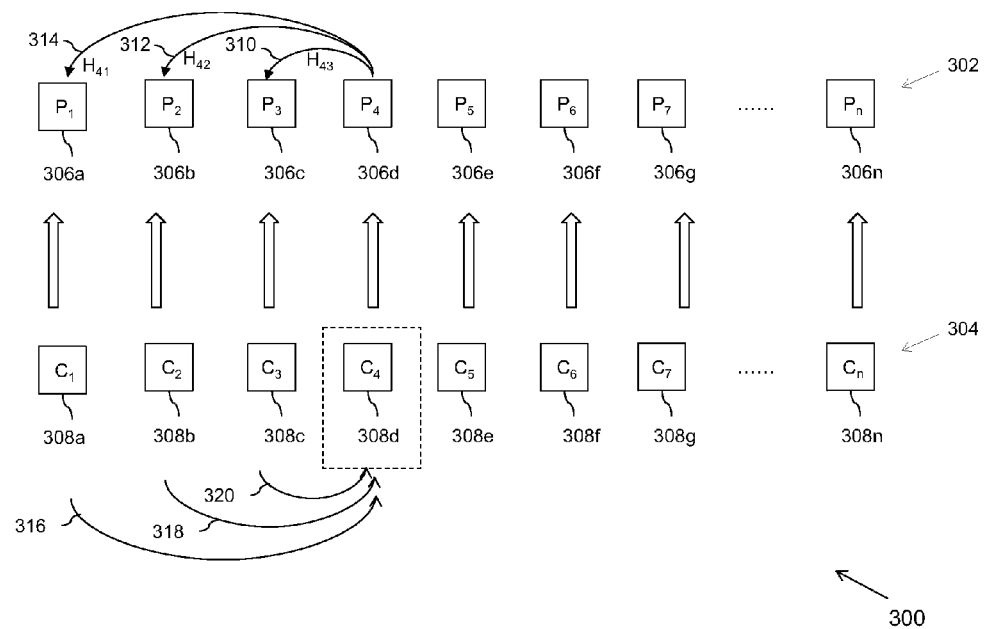
FIG. 3 is a schematic illustrating a logical process overview for processing of image frames in accordance with an example embodiment.

FIG. 3 is a schematic illustrating a logical process overview 300 for processing of image frames, such as colour image frames, in accordance with an example embodiment. As explained with reference to FIG. 2, colour image frames and panchromatic image frames associated with a scene may be received, for example, from the colour image sensor 208 and the panchromatic image sensor 210, respectively. In FIG. 3, the received panchromatic image frames and the colour image frames are depicted at 302 and 304, respectively. The panchromatic image frames include multiple panchromatic image frames, such as image frames 306a, 306b, 306c, 306d, 306e, 306f, 306g to 306n (referred to hereinafter as image frames $P_1$-$P_n$). The colour image frames include multiple colour image frames, such as image frames 308a, 308b, 308c, 308d, 308e, 308f, 308g to 308n (referred to hereinafter as image frames $C_1$-$C_n$).

Further, as explained with reference to FIG. 2, a frame rate associated with the panchromatic image frames and the colour image frames may be configured to be equal. On account of the colour image sensor 208 and the panchromatic image sensor 210 capturing image frames corresponding to the scene simultaneously at the same frame rate, the colour image frames $C_1$-$C_n$ may correspond to the panchromatic image frames $P_1$-$P_n$. In an example embodiment, each colour image frame may correspond to a panchromatic image frame as depicted by block arrows in FIG. 3. For example, the colour image frame $C_1$ corresponds to the panchromatic image frame $P_1$, the colour image frame $C_2$ corresponds to the panchromatic image frame $C_2$ and so on and so forth.

A registration information may be computed based on a panchromatic image frame and one or more panchromatic image frames from among the panchromatic image frames. For example, the registration information may be computed based on a panchromatic image frame $P_4$ and panchromatic image frames $P_1$-$P_3$. Computing the registration information may involve computing global registration information and local registration information. For computing the global registration information, features may be extracted and matched from the panchromatic image frames as explained with reference to FIG. 2. A homography transformation (for example, in form of a homography transformation matrix) may be determined from the matched features of pairs of panchromatic image frames. For example, a homography transformation may be determined between the panchromatic image frame $P_4$ and the panchromatic image frame $P_3$. A determination of the homography transformation between panchromatic image frames is exemplarily depicted in form of curved arrows 310, 312 and 314 corresponding to the determination of the homography transformation between pairs of panchromatic image frames $P_4$-$P_3$, $P_4$-$P_2$, and $P_4$-$P_1$. Further, each curved arrow is associated with homography transformation matrix notation outlining the determined homography transformation between pairs of panchromatic image frames. For example, the curved arrow 310 is associated with $H_{43}$ capturing the homography transition between the panchromatic image frame $P_4$ and the panchromatic image frame $P_3$. Similarly, the curved arrows 312 and 314 are associated with $H_{42}$ and $H_{41}$ corresponding to the homography transformation between panchromatic image frames $P_4$ and $P_2$, and, $P_4$ and $P_1$, respectively.

The global registration information in form of the homography transformation may be utilized for computing the local registration information. The computation of the local registration information for the panchromatic image frame $P_4$ is explained below with reference to panchromatic image frame $P_3$. It is noted that local registration information may similarly be computed for the for the panchromatic image frame $P_4$ corresponding to the panchromatic image frames $P_2$ and $P_1$.

For computing the local registration information for panchromatic image frame $P_4$, a compensated panchromatic image frame corresponding panchromatic image frame $P_3$ based on the homography transformation (for example, $H_{43}$) may be generated. The compensated panchromatic image frame may be represented as $H_{43}*P_3$. A difference image frame may be computed based on the compensated panchromatic image frame $H_{43}*P_3$ from the panchromatic image frame $P_4$. For example, the difference image frame, denoted as $D_{43}$ may be computed as depicted by equation (4) as:

$$D_{43}=P_4-H_{43}*P_3 \quad \text{Eq. (4)}$$

A pixel value attribute, such as an average pixel value or a maximum pixel value associated with each block of pixels (for example, 32×32 pixel blocks) of a plurality of blocks of pixels configuring the difference image frame $D_{43}$ may be computed and compared with a pre-defined threshold value. For each block of pixels whose pixel value attribute exceeds the pre-defined threshold value, motion compensation may be performed and local motion vector information may be generated. The local motion vector information corresponding to the panchromatic image frame $P_3$ may include motion vector information for all pixel blocks whose pixel value attribute exceeds the pre-defined threshold value. The local registration information for the panchromatic image frame $P_4$ may similarly be computed corresponding to panchromatic image frames $P_2$ and $P_1$.

The global registration information and the local registration information computed corresponding to the panchromatic image frame $P_4$ may be utilized for modifying the colour image frame $C_4$, which corresponds to the panchromatic image frame $P_4$. A global registration information and the local registration information for the colour image frame $C_4$ corresponding to colour image frames $C_1$-$C_3$ may be considered to be equivalent to the registration information between the panchromatic image frame $P_4$ and the panchromatic image frames $P_1$-$P_3$ on account of correspondence between the colour image frames and the panchromatic image frames. Based on the registration information, pixel values for pixels from colour image frames $C_1$-$C_3$ may be added to pixel values of the corresponding pixels of colour image frame $C_4$ for modifying the colour image frame $C_4$. Alternatively, based on the registration information, pixel values for pixels of the colour image frame $C_4$ may be updated with average pixel values obtained from averaging of pixel values of pixels of colour image frames $C_1$-$C_3$ and pixel values of the corresponding pixels of colour image frame $C_4$ for modifying the colour image frame $C_4$. The addition/updation of pixel values of the pixels corresponding to the colour image frame $C_4$ based on pixel values associated with corresponding pixels in the colour image frames $C_1$-$C_3$ is depicted in form of curved arrows 316, 318 and 320 in FIG. 3. An intensity of the modified colour image frame is greater than intensity associated with the unmodified colour image frame $C_4$ on account of addition/updation of the pixel values of pixels corresponding to the colour image frame $C_4$. One or more colour image frames, such as colour image frames $C_2$, $C_5$, $C_6$ and the like may similarly be modified thereby increasing a brightness of colour image frames captured in low light conditions. For achieving a desired light intensity in the colour image frame, a number of colour image frames from which the pixel values may be added/averaged may be determined based on tone mapping as explained with reference to FIG. 2.

Figure 4A:
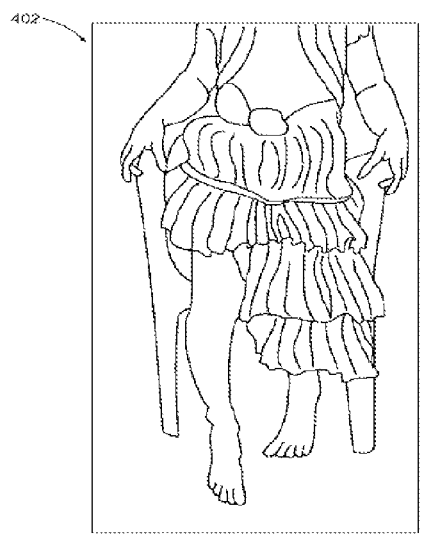
FIGS. 4A, 4B and 4C illustrate computation of a difference image frame for computing the local registration information in accordance with an example embodiment.
Figure 4B:
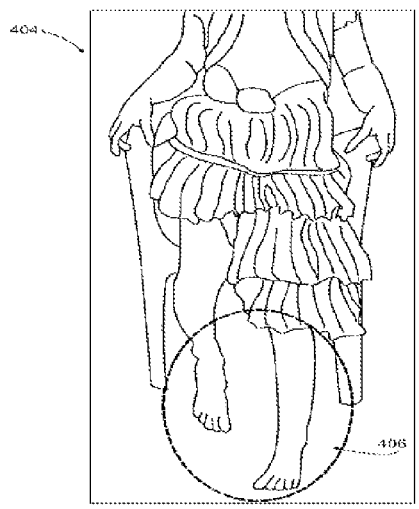
Figure 4C:
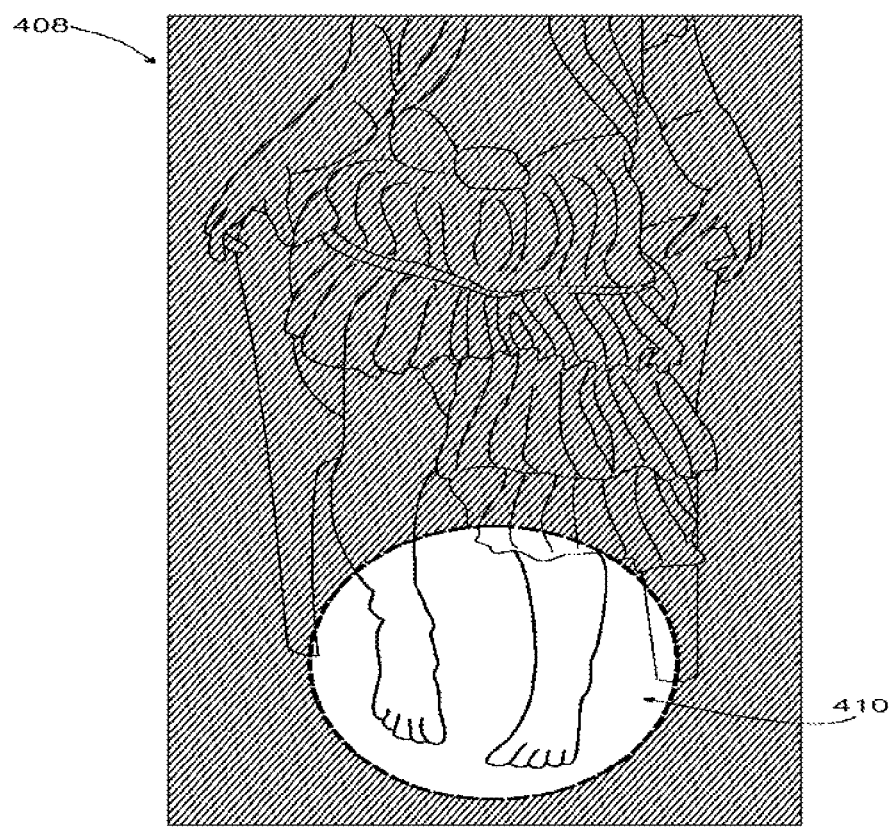

FIGS. 4A, 4B and 4C illustrate computation of a difference image frame for computing the local registration information in accordance with an example embodiment. FIGS. 4A and 4B depict panchromatic image frames 402 and 404 respectively. The panchromatic image frames 402 and 404 may be received from the panchromatic image sensor 210 of the apparatus 200. Further, as explained with reference to FIG. 2, image frames captured by image sensors, such as the panchromatic image sensor 210, may include distortion on account of movement of the image capture medium. Further, the captured image may also correspond to a scene where an object is in motion. For example, the panchromatic image frame 404 captured subsequent to the panchromatic image frame 402 depicts a movement of a leg portion of a child (depicted by circular area 406 in FIG. 4B) from its initial position in the panchromatic image frame 402. As a result of such local motion, in addition to performing computing a global registration to account for movement of an image sensor, a local registration may be performed to account for local motion in the captured image frames.

For computing the local registration information, a homography transformation may be computed between current panchromatic image frame 404 and previous panchromatic image frame 402. The previous panchromatic image frame 402 may be compensated based on the computed homography transformation. Further, the compensated panchromatic image frame 402 may be subtracted from the current panchromatic image frame 404 to generate a difference image frame. The difference image frame computed in such a manner is depicted in FIG. 4C as difference image frame 408. The difference image frame 408 captures the local motion information as depicted to be encompassed in circular area 410. The difference image frame 408 may be divided to blocks of pixels (for example, 32×32 pixel blocks) and a pixel value attribute (for example, an average pixel value, a maximum pixel value and/or pixel value sum) of each block of pixels may be computed. The pixel value attribute for each block of pixels may be compared with a pre-defined threshold value, such as the pre-defined threshold value explained with reference to FIG. 2. If the pixel value attribute corresponding to a block of pixels exceeds the pre-defined threshold value, then motion compensation may be performed for such blocks and corresponding local motion vector information generated. The local motion vector information along with the homography transformation may be utilized for modifying a colour image frame corresponding to the panchromatic image frame 404 as explained with reference to FIGS. 2 and 3. A method for processing of image frames is explained in FIG. 5.

Figure 5:
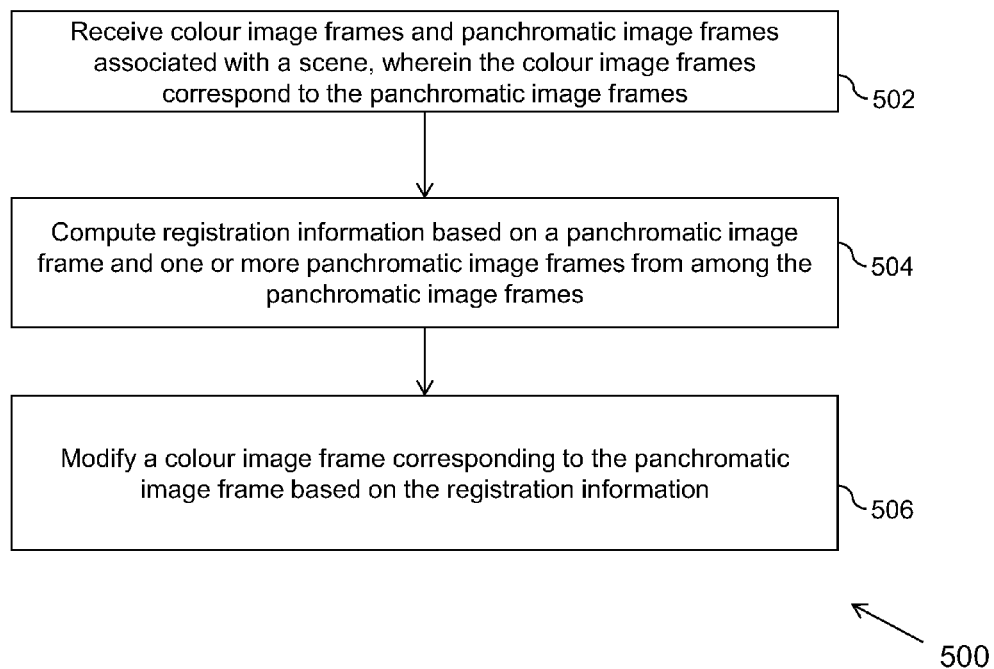
FIG. 5 is a flowchart depicting an example method for processing of image frames in accordance with an example embodiment.

FIG. 5 is a flowchart depicting an example method 500 for processing of image frames in accordance with an example embodiment. The method 500 depicted in flow chart may be executed by, for example, the apparatus 200 of FIG. 2. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 500 are described with help of apparatus 200 of FIG. 2. However, the operations of the method can be described and/or practiced by using any other apparatus.

At block 502 of method 500, colour image frames and panchromatic image frames associated with a scene are received. In an embodiment, the colour image frames may be received from a colour image sensor, such as the colour image sensor 208. In an embodiment, the panchromatic image frames may be received from a panchromatic image sensor, such as the panchromatic image sensor 210. The scene may include one or more objects in a surrounding environment, for example, a person or a gathering of individuals, birds, books, a playground, natural scenery, such as a mountain, and the like. In an embodiment, the colour image frames and the panchromatic image frames may be received from an internal memory such as hard drive, random access memory (RAM) of the apparatus 200 or from an external storage medium such as digital versatile disk, compact disk, flash drive, memory card, or from external storage locations through Internet, Bluetooth®, and the like. The colour image frames and the panchromatic image frames may also be received from the memory 204. In an embodiment, the colour image frames and the panchromatic image frames may be received via network. Examples of the network may include a wired network, a wireless network and/or a combination thereof. Examples of the wired network include but are not limited to local area network, wide area network, Ethernet and the like. Examples of the wireless network include but are not limited to cellular network, Wi-Fi network, wireless LAN, Zigbee network and the like. An example of combination of the wired network and the wireless network may include but is not limited to the Internet.

In an embodiment, a frame rate associated with the capture of the colour image frames may be configured to be equal to the frame rate associated with the capture of the panchromatic image frames. In an embodiment, on account of a sensitivity of the panchromatic image sensor being almost three times a sensitivity of the colour image sensor, an auto exposure of the panchromatic image sensor may be configured to be $1/3^{rd}$ of the auto exposure of the colour image sensor for capturing an equivalent number of frames in a given time duration. In an embodiment, an auto exposure for capturing image frames by the colour image sensor may be determined using standard auto-exposure algorithms and the auto-exposure associated with the panchromatic image sensor may be configured to be $1/3^{rd}$ of the auto-exposure determined for the colour image sensor. On account of the frame rate configured to be equal, the colour image frames correspond to the panchromatic image frames. In an embodiment, each colour image frame may correspond to a panchromatic image frame. For example, if $C_1, C_2, C_3 \ldots C_N$ and $P_1, P_2, P_3 \ldots P_N$ are the colour image frames and the panchromatic image frames captured by the colour image sensor and the panchromatic image sensor, respectively, then the colour image frame $C_1$ may correspond to panchromatic image frame $P_1$, the colour image frame $C_2$ may correspond to panchromatic image frame $P_2$ and so on and so forth.

At block 504, registration information is computed based on a panchromatic image frame and one or more panchromatic image frames from among the panchromatic image frames. In an embodiment, computing the registration information may include computing the global registration information (for example, homography transformation) and the local registration information (for example, local motion vector information). The computation of the global registration information and the local registration information may be performed as explained with reference to FIGS. 2-4B.

At block 506, a colour image frame corresponding to the panchromatic image frame is modified based on the registration information. For example, if the registration information is computed for a panchromatic image frame $P_1$, then a colour image frame, for example colour image frame $C_1$, corresponding to the panchromatic image frame $P_1$ from among the colour image frames may be modified based on the computed registration information.

In an embodiment, pixels values of pixels of the one or more colour image frames may be added to pixel values of corresponding pixels of the colour image frame based on the registration information for modifying the colour image frame. As explained, the registration information computed for the panchromatic image frame may be used as the registration information for the colour image frame and the one or more colour image frames. Based on the registration information, similar pixels across the colour image frame and the one or more colour image frames may be aligned and the pixel values (for example, values corresponding to luminance/chrominance and in effect an intensity of the pixels) in the one or more colour image frames may be added to the pixel values of the corresponding pixels in the colour image frame for increasing an intensity associated with the colour image frame. In an embodiment, pixel values of pixels of the colour image frame may be updated with average pixel values obtained from averaging of pixel values of pixels in the one or more colour image frames and the pixel values of the corresponding pixels of the colour image frame based on the registration information for modifying the colour image frame. In an embodiment, the pixel values of the one or more colour image frames may be added and sum value may be averaged with the pixel values of the colour image frame. The pixel values of the colour image frame may be updated with the average pixel values for modifying the colour image frame.

In an embodiment, an intensity of the modified colour image frame is greater than intensity associated with the unmodified colour image frame. One or more colour image frames may be similarly be modified thereby increasing a brightness of the colour image frames captured in low light conditions. Another method for processing of image frames is explained in detail with reference to FIGS. 6A and 6B.

Figure 6A:
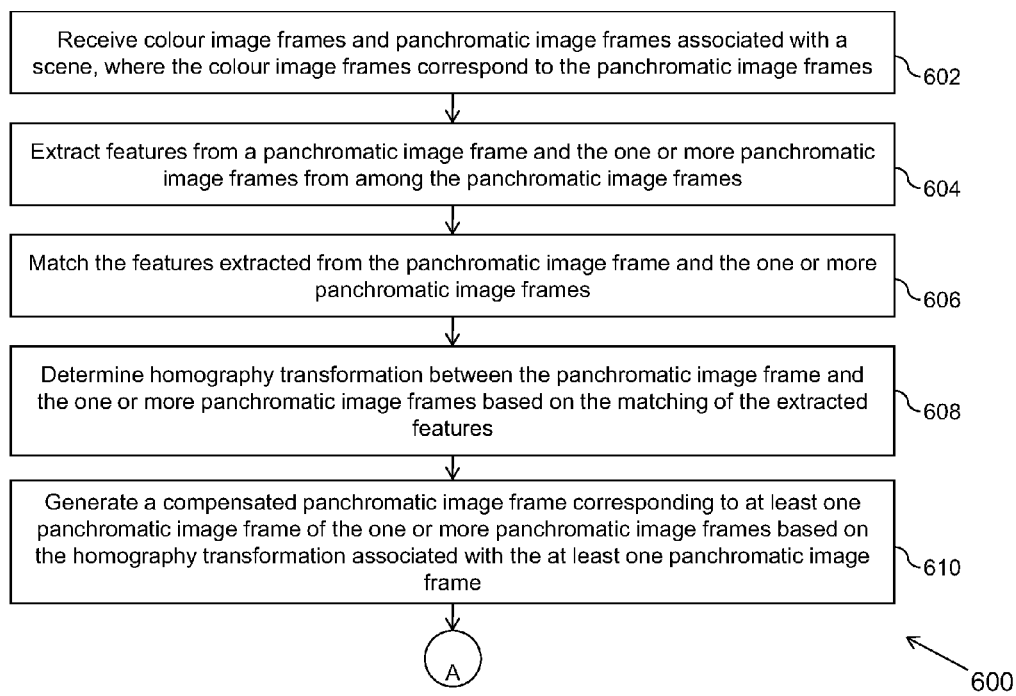
FIGS. 6A and 6B illustrate a flowchart depicting an example method for processing of image frames in accordance with another example embodiment.
Figure 6B:
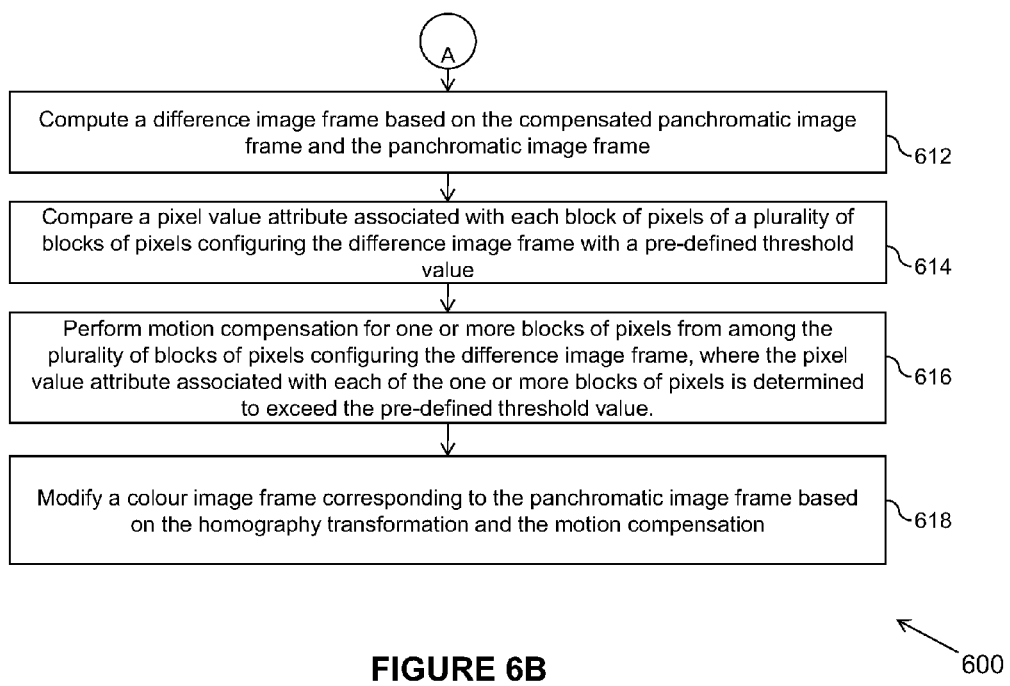

FIGS. 6A and 6B illustrate a flowchart depicting an example method 600 for processing of image frames in accordance with another example embodiment. The apparatus 200 of FIG. 2 may employ the method 600 for processing of image frames. At block 602 of method 600, colour image frames and panchromatic image frames associated with a scene are received, where the colour image frames correspond to the panchromatic image frames. The reception of the colour image frames and panchromatic image frames may be performed as explained with reference to block 502 of FIG. 5.

At block 604, features are extracted from the panchromatic image frame and the one or more panchromatic image frames from among the panchromatic image frames. Examples of the features may include, but are not limited to, corners, edges of an image frame, or other region of interest such as background of the scene. In an example embodiment, algorithms such as scale-invariant feature transform (SIFT), Harris corner detector, smallest univalue segment assimilating nucleus (SUSAN) corner detector, features from accelerated segment test (FAST) may be utilized for extracting features associated with the panchromatic image frame and the one or more panchromatic image frames. Alternatively, extracting the features may be performed by applying one of DCT, DST, KLT transform and a Hadamard transform on macroblocks corresponding to the panchromatic image frame and the one or more panchromatic image frames. In an example embodiment, the DCT is applied on macroblocks corresponding to the panchromatic image frame and the one or more panchromatic image frames and the DC components thus obtained may be treated as features. In an embodiment, the DC components may be obtained by partially decoding the panchromatic image frame and the one or more panchromatic image frames.

At block 606, the features extracted from the panchromatic image frame and the one or more panchromatic image frames are matched. At block 608, homography transformation between the panchromatic image frame and the one or more panchromatic image frames is determined based on the matching of the extracted features. In an embodiment, algorithms such as random sample consensus (RANSAC) may be used for determining the homography transformation between the panchromatic image frame and the one or more panchromatic image frames. In an embodiment, the homography transformation between the panchromatic image frame and another panchromatic image frame may be represented in form of registration matrix. For example, features from a panchromatic image frame $P_1$ and a panchromatic image frame $P_2$ may be extracted and matched. A homography transformation may be determined between $P_1$ and $P_2$, and the determined homography transformation may be represented in form a registration matrix $H_{12}$.

At block 610, a compensated panchromatic image frame is generated corresponding to at least one panchromatic image frame of the one or more panchromatic image frames based on the homography transformation associated with the at least one panchromatic image frame. At block 612, a difference image frame is computed based on the compensated panchromatic image frame and the panchromatic image frame. The generation of the compensated panchromatic image frame and the computation of the difference image frame may be performed as explained with reference to FIGS. 2-4B.

At block 614, a pixel value attribute, (for example, an average pixel value, a maximum pixel value, a pixel value sum and the like) associated with each block of pixels (for example, 32×32 pixel blocks) of a plurality of blocks of pixels configuring the difference image frame is computed and compared with a pre-defined threshold value for computing the local registration information. In an example embodiment, the pre-defined threshold value may be heuristically determined and may correspond to substantially small value approaching zero. At block 616, motion compensation is performed for one or more non-overlapping blocks of pixels from among the plurality of blocks of pixels configuring the difference image frame, where the pixel value attribute associated with each of the one or more blocks of pixels is determined to exceed the pre-defined threshold value. In an embodiment, performing the motion compensation for each block of pixels generates local motion vector information. In an embodiment, the local registration information may include the local motion vector information corresponding to one or more blocks of the difference image frame. At block 618, a colour image frame corresponding to the panchromatic image frame is modified based on the homography transformation and the motion compensation (for example, local registration information). The modification of the colour image frame may be performed as explained at block 506 of FIG. 5.

In an embodiment, a number of colour image frames in the one or more colour image frames may be determined for modifying the colour image frame. In an embodiment, the number of colour image frames in the one or more colour image frames for modifying the colour image frame is determined based on tone mapping. For example, based on the tone mapping, it may be determined that achieved a desired light intensity in the colour image frame may require addition and/or averaging of pixel values from 'X' number of colour image frames from among the one or more colour image frames. Accordingly, based on the homography transformation and local registration information, pixel values from only those 'X' number of colour image frames may be utilized for modifying the colour image frame. In an embodiment, the number of colour image frames of the one or more colour image frames may be determined as explained with reference to FIG. 2.

To facilitate discussion of the methods 500 and/or 600 of FIGS. 5, 6A and 6B, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein. Moreover, certain operations of the methods 500 and/or 600 are performed in an automated fashion. These operations involve substantially no interaction with the user. Other operations of the methods 500 and/or 600 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to perform processing of image frames. As explained in FIGS. 2-6B, the processing of image frames involves computing registration information accurately using the panchromatic image frames. The panchromatic image frames have higher light intensity on account of approximately three times sensitivity of the panchromatic image sensor as compared to the colour image sensor (for example, a Bayer sensor) and hence the registration information is accurate. Moreover, a reliability of motion estimation/compensation for panchromatic image frames is more robust compared to the colour image frames, thereby enabling accurate local motion vector computation. Since the panchromatic image frames and the colour image frames correspond to each other, the registration information computed for the panchromatic image sensor may be utilized for the colour image frames to modify the colour image frames. The modification of the colour image frames involves summing/averaging pixel values from neighbouring colour frames which improves the signal strength while decreasing the noise in the colour image frames, thereby enhancing low-light video. The registration information computed from the panchromatic image frames may also be utilized for modifying and stitching colour image frames to enhance low-light panorama image frames.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

I claim:

1. A method comprising:
    receiving colour image frames and panchromatic image frames associated with a scene, wherein the colour image frames correspond to the panchromatic image frames;
    computing registration information based on a panchromatic image frame and one or more panchromatic image frames from among the panchromatic image frames; and
    modifying a colour image frame corresponding to the panchromatic image frame based on the registration information, wherein modifying the colour image frame further comprises adding pixel values of pixels of one or more colour image frames to pixel values of corresponding pixels of the colour image frame based on the registration information.

2. The method as claimed in claim 1, further comprising:
    determining registration information from the colour image frame and the one or more colour image frames from among the colour image frames, wherein the one or more colour image frames correspond to the one or more panchromatic image frames.

3. The method as claimed in claim 2, wherein modifying the colour image frame comprises updating pixel values of pixels of the colour image frame with average pixel values obtained from averaging of pixel values of pixels in the one or more colour image frames and the pixel values of the corresponding pixels of the colour image frame based on the registration information.

4. The method as claimed in claim 2, further comprising computing a global registration information by performing:
    extracting features from the panchromatic image frame and the one or more panchromatic image frames;
    matching the features extracted from the panchromatic image frame and the one or more panchromatic image frames; and
    determining homography transformation between the panchromatic image frame and the one or more panchromatic image frames based on the matching of the extracted features.

5. The method as claimed in claim 2, further comprises computing a local registration information by performing:
    generating a compensated panchromatic image frame corresponding to at least one panchromatic image frame of the one or more panchromatic image frames based on the homography transformation associated with the at least one panchromatic image frame;
    computing a difference image frame based on the compensated panchromatic image frame and the panchromatic image frame; and
    comparing a pixel value attribute associated with each block of pixels of a plurality of blocks of pixels configuring the difference image frame with a pre-defined threshold value.

6. The method as claimed in claim 5, wherein computing the local registration information comprises:
    performing motion compensation for one or more blocks of pixels from among the plurality of blocks of pixels configuring the difference image frame, wherein the pixel value attribute associated with each of the one or more blocks of pixels is determined to exceed the pre-defined threshold value.

7. The method as claimed in claim 6, further comprises determining, based on tone mapping, a number of colour image frames in the one or more colour image frames for modifying the colour image frame.

8. An apparatus comprising:
    at least one processor; and
    at least one memory comprising computer program code, the at least one memory and the computer program code configured to, with the at least one processor, cause the apparatus to at least perform:
        receive colour image frames and panchromatic image frames associated with a scene, wherein the colour image frames correspond to the panchromatic image frames;
        compute registration information based on a panchromatic image frame and one or more panchromatic image frames from among the panchromatic image frames;
        modify a colour image frame corresponding to the panchromatic image frame based on the registration information; and
        add pixel values of pixels of one or more colour image frames to pixel values of corresponding pixels of the colour image frame based on the registration information for modifying the colour image frame.

9. The apparatus as claimed in claim 8, wherein the apparatus is further caused, at least in part, to:
    determine registration information from the colour image frame and the one or more colour image frames from among the colour image frames, wherein the one or more colour image frames correspond to the one or more panchromatic image frames.

10. The apparatus as claimed in claim 9, wherein the apparatus is further caused, at least in part, to:
    update pixel values of pixels of the colour image frame with average pixel values obtained from averaging of pixel values of pixels in the one or more colour image frames and the pixel values of the corresponding pixels of the colour image frame based on the registration information.

11. The apparatus as claimed in claim 9, wherein the apparatus is further caused, at least in part, to: compute a global registration information by:
   extracting features from the panchromatic image frame and the one or more panchromatic image frames;
   matching the features extracted from the panchromatic image frame and the one or more panchromatic image frames; and
   determining homography transformation between the panchromatic image frame and the one or more panchromatic image frames based on the matching of the extracted features.

12. The apparatus as claimed in claim 9, wherein the apparatus is further caused, at least in part, to: compute a local registration information by:
   generating a compensated panchromatic image frame corresponding to at least one panchromatic image frame of the one or more panchromatic image frames based on the homography transformation associated with the at least one panchromatic image frame;
   computing a difference image frame based on the compensated panchromatic image frame and the panchromatic image frame; and
   comparing a pixel value attribute associated with each block of pixels of a plurality of blocks of pixels configuring the difference image frame with a pre-defined threshold value.

13. The apparatus as claimed claim 12, wherein computing the local registration information further comprises:
   performing motion compensation for one or more blocks of pixels from among the plurality of blocks of pixels configuring the difference image frame, wherein the pixel value attribute associated with each of the one or more blocks of pixels is determined to exceed the pre-defined threshold value.

14. The apparatus as claimed in claim 13, wherein the apparatus is further caused, at least in part, to: determine a number of colour image frames in the one or more colour image frames for modifying the colour image frame based on tone mapping.

15. A computer program product comprising at least one computer-readable storage medium, the computer-readable storage medium comprising a set of instructions, which, when executed by one or more processors, cause an apparatus to at least perform:
   receive colour image frames and panchromatic image frames associated with a scene, wherein the colour image frames correspond to the panchromatic image frames;
   compute registration information based on a panchromatic image frame and one or more panchromatic image frames from among the panchromatic image frames;
   modify a colour image frame corresponding to the panchromatic image frame based on the registration information; and
   add pixel values of pixels of one or more colour image frames to pixel values of corresponding pixels of the colour image frame based on the registration information for modifying the colour image frame.

16. The computer program product as claimed in claim 15, wherein the apparatus is further caused, at least in part, to:
   determine registration information from the colour image frame and the one or more colour image frames from among the colour image frames, wherein the one or more colour image frames correspond to the one or more panchromatic image frames.

17. The computer program product as claimed in claim 16, wherein the apparatus is further caused, at least in part, to:
   update pixel values of pixels of the colour image frame with average pixel values obtained from averaging of pixel values of pixels in the one or more colour image frames and the pixel values of the corresponding pixels of the colour image frame based on the registration information.

18. The computer program product as claimed in claim 16, wherein the apparatus is further caused, at least in part, to: compute a global registration information by:
   extracting features from the panchromatic image frame and the one or more panchromatic image frames;
   matching the features extracted from the panchromatic image frame and the one or more panchromatic image frames; and
   determining homography transformation between the panchromatic image frame and the one or more panchromatic image frames based on the matching of the extracted features.

19. The computer program product as claimed in claim 16, wherein the apparatus is further caused, at least in part, to: compute a local registration information by:
   generating a compensated panchromatic image frame corresponding to at least one panchromatic image frame of the one or more panchromatic image frames based on the homography transformation associated with the at least one panchromatic image frame;
   computing a difference image frame based on the compensated panchromatic image frame and the panchromatic image frame; and
   comparing a pixel value attribute associated with each block of pixels of a plurality of blocks of pixels configuring the difference image frame with a pre-defined threshold value.

20. The computer program product as claimed in claim 19, wherein computing the local registration information further comprises:
   performing motion compensation for one or more blocks of pixels from among the plurality of blocks of pixels configuring the difference image frame, wherein the pixel value attribute associated with each of the one or more blocks of pixels is determined to exceed the pre-defined threshold value.

* * * * *